Sept. 4, 1962 R. C. RUSSELL 3,052,137
DIFFERENTIAL MECHANISM
Filed Feb. 27, 1959 3 Sheets-Sheet 1
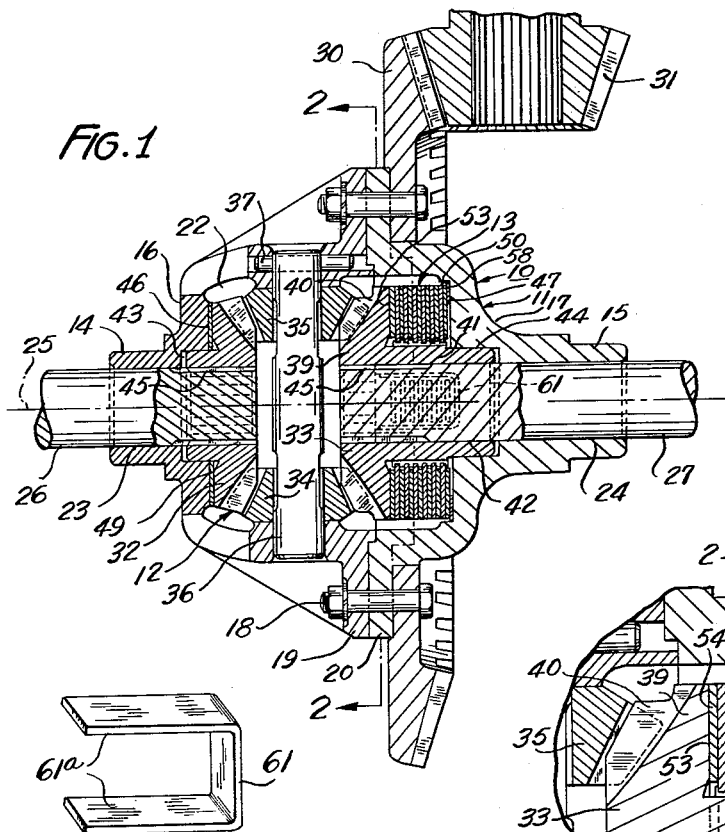
FIG.1
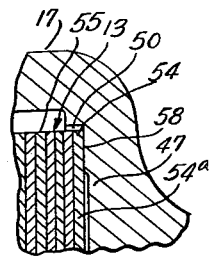
FIG.5
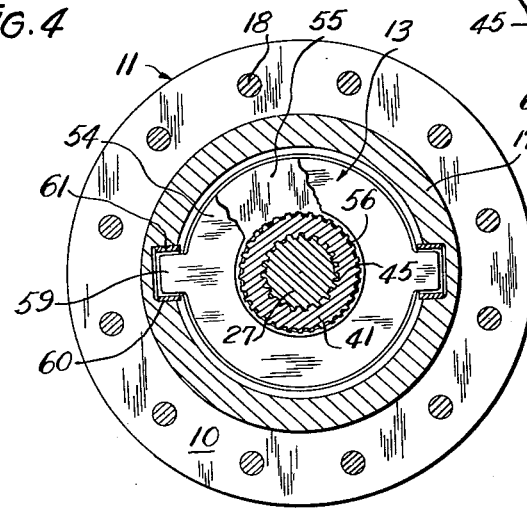
FIG.4
FIG.2
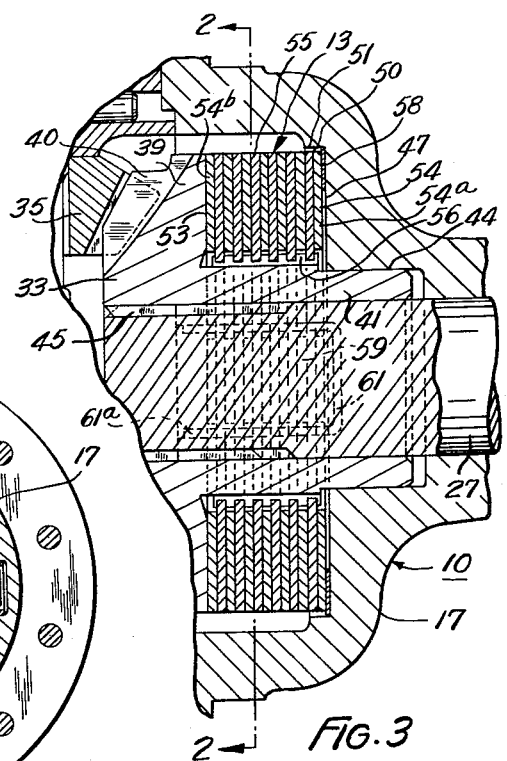
FIG.3
INVENTOR.
ROBERT C. RUSSELL
BY Hudson, Boughton,
Williams, David & Hoffmann
ATTORNEYS Sept. 4, 1962  R. C. RUSSELL  3,052,137
DIFFERENTIAL MECHANISM
Filed Feb. 27, 1959  3 Sheets-Sheet 2

INVENTOR.
ROBERT C. RUSSELL
BY Hudson Boughton,
Williams, David & Hoffmann
ATTORNEYS

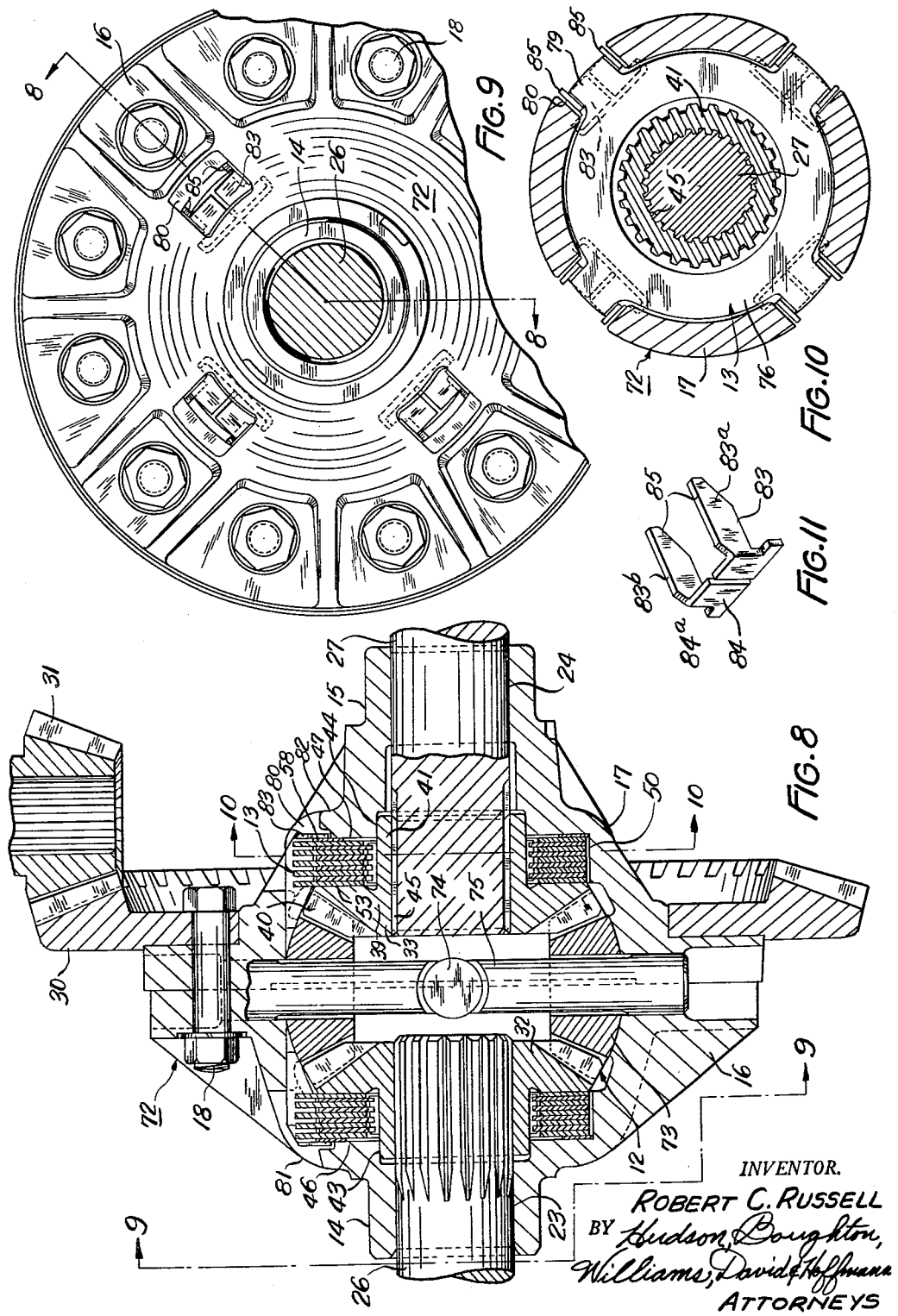

United States Patent Office 3,052,137
Patented Sept. 4, 1962

---

3,052,137
DIFFERENTIAL MECHANISM
Robert C. Russell, Shaker Heights, Ohio, assignor to Eaton Manufacturing Company, Cleveland, Ohio, a corporation of Ohio
Filed Feb. 27, 1959, Ser. No. 795,993
13 Claims. (Cl. 74—710.5)

This invention relates to differential gear mechanisms of the type frequently used in vehicle axles and, as one of its objects, aims to provide a novel construction of a simple and highly practical form for differential mechanisms of this kind.

Attempts have been made heretofore to incorporate in such differential mechanisms a means for minimizing traction wheel slippage but such attempts have usually resulted in a prohibitive increase in the complexity and cost of the mechanisms. The present invention achieves, to a high degree, the desired aim of reduced wheel slippage and accomplishes this without any great increase in the complexity or cost of the differential mechanism.

A further object is to provide a novel differential gear mechanism embodying friction clutch means in association with the gear train thereof and also having means for increasing the effectiveness of the friction clutch means to the extent that traction wheel slippage is reduced to a minimum.

Still another object is to provide a novel differential mechanism of the character just above mentioned wherein the clutch means is pressure-responsive and is actuatable by limited shifting of a side gear of the gear train in response to the pressure-angle torque reaction between the meshed gears, and wherein annular thrust means for applying the actuating pressure to the clutch means is so located as to effectively concentrate the pressure at a maximum lever arm distance from the rotation axis.

Figure 7:
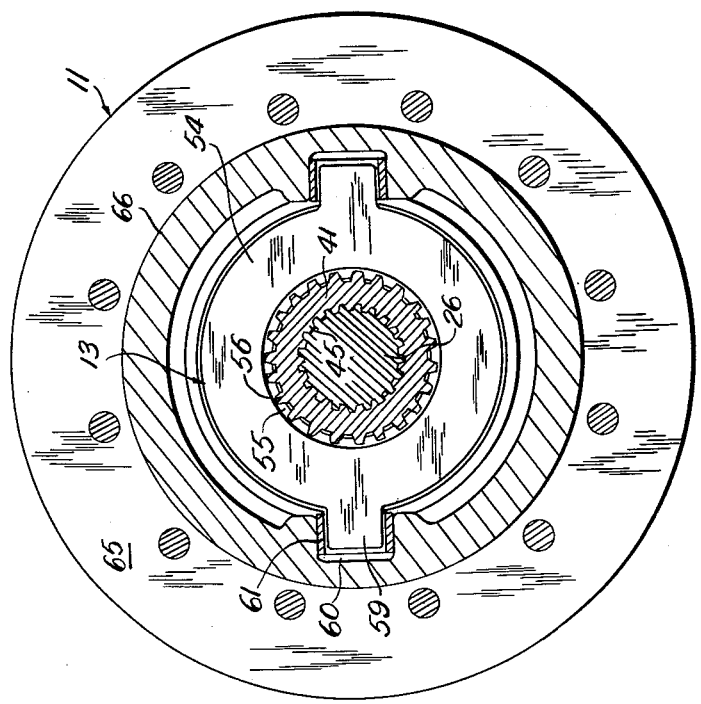
Figure 6:
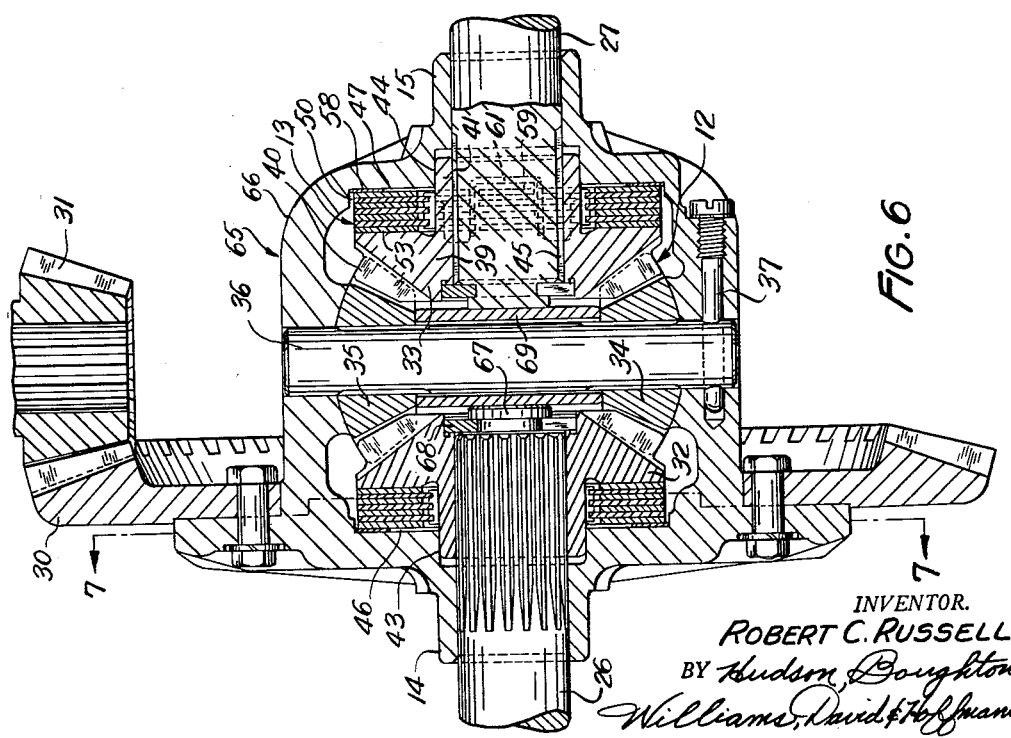

Other objects and advantages of this invention will be apparent in the following detailed description and in the accompanying drawings forming a part of this specification and in which, FIG. 1 is an axial section taken through a differential gear mechanism embodying this invention, FIG. 2 is a section taken through the mechanism transversely of the rotation axis as indicated by section line 2—2 of FIGS. 1 and 3, FIG. 3 is a fragmentary axial sectional view taken through the clutch means and corresponding with a portion of FIG. 1 but on a larger scale, FIG. 4 is a perspective view showing an insert of the mechanism in a detached relation, FIG. 5 is a fragmentary axial sectional view similar to that of FIG. 3 but showing an alternative construction for one of the features of the differential mechanism, FIG. 6 is an axial section similar to that of FIG. 1 but showing a first modified form of differential mechanism, FIG. 7 is a transverse sectional view taken on section line 7—7 of FIG. 6, FIG. 8 is an axial section taken through a second modified form of differential mechanism, the view being taken as indicated by section line 8—8 of FIG. 9, FIG. 9 is mainly an end elevation of the differential mechanism when viewed axially thereof as indicated by the directional line 9—9 of FIG. 8, FIG. 10 is a sectional view taken transversely of the rotation axis as indicated by section line 10—10 of FIG. 8, and FIG. 11 is a perspective view showing an insert of the differential mechanism of FIG. 8 in a detached relation.

As representing one of the preferred embodiments of this invention, FIGS. 1 to 3 inclusive show a differential gear mechanism 10 which can be used for various purposes but which is especially suitable for vehicle axle use and comprises, in general, a rotatable casing 11, a gear train 12, and friction clutch means 13 associated with one or more gears of the gear train for retarding rotation thereof relative to the casing for minimizing traction wheel slippage as will be explained hereinafter.

The casing 11 is provided with support portions of journals 14 and 15 adapted to be received in bearings of a supporting structure, such as an axle housing (not shown), by which the casing is rotatably supported. The casing 11 is here shown as comprising a pair of connected complemental casing sections 16 and 17 on which the support portions 14 and 15 are formed and which sections are secured together by connecting bolts 18 extending through flanges 19 and 20 thereof. The casing sections 16 and 17 are hollow and define therebetween a gear chamber 22 in which the gear train 12 and the friction clutch means 13 are located.

The casing sections 16 and 17 are provided with openings 23 and 24 extending through the portions of these sections on which the journals 14 and 15 are formed and which openings are disposed in an aligned relation on a common axis 25 which is also the rotation axis of the casing 11. The axial openings 23 and 24 receive or accommodate the driven or power output shaft means, which is here represented by axle shafts 26 and 27 whose outer ends are connected with traction wheels or the like (not shown) and whose inner or adjacent ends are connected with the gear train 12 as will be explained hereinafter.

The differential mechanism 10 also includes a conventional ring gear 30 extending around and mounted on the casing 11 by means of the connecting bolts 18. A drive pinion 31 is here shown in mesh with the the ring gear 30 and represents the power input means of the differential mechanism 10.

The gear train 12 comprises a pair of bevel-type side gears 32 and 33 and a group of bevel-type idler or pinion gears, in this case two such gears 34 and 35 disposed between and in meshed engagement with the side gears for connecting the latter. The pinions 34 and 35 are rotatably supported in the casing 11 as by means of a pinion shaft 36 extending across the gear chamber 22 and secured in the casing by a suitable anchor pin 37 extending through the pinion shaft transversely thereof.

The side gears 32, 33 and the pinion gears 34, 35 are all spur gears of a conventional form, so far as the teeth thereof are concerned, and the tooth profiles are of a conventional shape having pressure-angle values coming within the usual range of such values. The side gears 32 and 33 each comprise an annular body 39 having the teeth 40 formed thereon and a central hollow sleeve or hub 41 connected with the body and extending coaxially with the rotation axis 25. The casing 11 is provided with hollow annular bearing portions or axial sockets 43 and 44 and the side gears 32 and 33 are rotatably supported in the casing by having their hubs 41 rotatably received in these hollow bearings. The side gears 32 and 33 are provided with splines 45 in the hub openings thereof and which are engaged by corresponding splines formed on the inner ends of the axle shafts 26 and 27 for connecting such shafts with the side gears.

The casing sections 16 and 17 are provided with annular thrust portions 46 and 47 which surround the hollow bearing portions 43 and 44 and are here represented as being flat end wall surfaces formed on these casing sections and lying in parallel planes extending transversely of the rotation axis 25 in a substantially perpendicular relation to the latter. These annular thrust portions receive or absorb the outward axial thrust of the side gears 32 and 33 which results from the pressure-angle torque load reaction of the meshed teeth of the gear train 12.

The body of the side gear 32 is located in a direct rotative engagement with the thrust portion 46 or with a suitable bearing liner or annular shim 49 lying thereagainst.

As shown in FIGS. 1 and 3 the annular thrust portion 47 is formed by the radial end wall of a shallow counterbore 50 formed in the casing section 17 and which counterbore is disposed in a coaxial surrounding relation to the inner end of the hollow bearing portion 44. The counterbore 50 is thus defined, in part by the annular thrust portion 47 as the bottom or end wall of the counterbore, and in part by an annular or circumferential axial side wall 51. The body 39 of the side gear 33 is provided with an annular thrust portion 53 located in an axially opposed relation to the annular thrust portion 47 and here shown as being an annularly extending flat radial surface surrounding the hub 41.

The friction clutch means 13 is a pressure-responsive clutch means of a suitable type of construction and is located between the annular thrust portions 47 and 53 of the casing section 17 and the side gear 33 respectively so that limited outward axial shifting of this side gear in the casing 11, in response to the above-mentioned pressure-angle torque reaction from the meshed teeth of the gear train, will cause the clutch to be actuated to an engaged or energized condition. The clutch 13 is here shown as being a disk-type friction clutch having a first group of friction disks or plates 54 and a second group of such disks or plates 55 which are interleaved between the disks of the first group.

The clutch disks 54 are connected with the casing 11 by connecting means which will presently be described and the clutch disks 55 are connected with the hub 41 of the side gear 33. For this purpose, the hub 41 is provided with an annular group of splines 56 extending axially therealong and the associated clutch disks 55 have radial teeth engaged with such splines, as shown in the drawings. The splined connections of the clutch disks 55 with the hub 41 and the connections of the clutch disks 54 with the casing 11 permit sufficient axial shifting of the clutch disks in response to the limited outward axial movement of the side gear 33 to produce the above-mentioned engaged or energized condition of the clutch.

An important feature of the present invention consists in the provision of thrust means, or thrust concentrating means, in association with one or the other of the annular thrust portions 47 and 53 and which thrust means, in this instance, is shown as being a flat thrust ring or annular shim 58 located in the counterbore 50 and engaged by the outer end of the stack of friction disks of the clutch 13. The thrust ring 58 concentrates the actuating pressure being applied to the clutch 13 in a location or area lying opposite the major diameter portion of the clutch and of the body 39 of the side gear 33 so that the actuating pressure being applied to the clutch will be effective thereon at the maximum lever-arm distance from the rotation axis 25. This will cause the clutch 13 to be extremely effective in developing a frictional holding or braking action for the side gear 33 which will retard the rotation of this gear relative to the housing 11.

It is an important characteristic of the thrust ring 58 that this member is of a narrower radial width than the annular thrust portion 47 so that portions of the adjacent end disk of the clutch 13 lying radially inward of the thrust ring 58 will be in an axially spaced relation, or pressure relieved condition, with respect to the annular thrust portion 47. By providing the thrust ring 58 of a diameter such that its outer peripheral edge will engage or extend alongside the peripheral wall 51 of the counterbore 50, this ring will be confined by the counterbore and thus radially retained in its assembled position in the differential mechanism 10.

It is also a feature of this invention that the clutch disk lying adjacent the annular thrust portion 47 be a clutch disk of the relatively stationary group 54 so that the thrust ring 58 will be located between two relatively nonrotatable parts, namely such end disk 54a and the annular thrust portion 47.

Although the thrust ring 58 has been described above as being associated with the thrust portion 47 of the casing section 17, it was previously pointed out herein that this thrust ring could alternatively be associated with the annular thrust portion 53 of the side gear 33. In that case, the ring 58 would lie between the thrust portion 53 of this gear and the adjacent relatively nonrotatable end clutch disk 54b. The positioning and functioning of the thrust ring 58, when in the latter location in co-operation with the major diameter portion of the body of the side gear 33, would be equivalent in all respects to the positioning and functioning of this thrust ring adjacent the portion 47 as already described in detail above, with the exception that this ring would then not be located in a counterbore 50.

The annular thrust element 58, whether in the form of a separate ring or in the form of an integral land as described hereinafter, is of an appropriate external diameter, radial width and axial thickness for energizing the clutch 13 to its maximum extent or holding capability. The thickness of the thrust element 58 will usually be from five to twenty-five thousandths of an inch but can be of greater or less thickness depending upon the needs and characteristics of the clutch and various other factors.

The connection of the clutch disks 54 with the casing section 17 is also an important feature of this invention and, for the purpose of such connection or anchorage, these clutch disks are provided with circumferentially spaced radial anchorage lugs on the outer periphery thereof, in this case two such lugs 59 in a diametrically opposed location, as shown in FIG. 2. The lugs 59 project into correspondingly located openings or recesses 60 in the casing section 17 and co-operate with the adjacent portions of this casing section for holding the disks 54 against rotation relative to the casing section in which they are mounted.

To prevent gouging or abrading of such adjacent portions of the casing 17 by the lugs 59, this invention provides inserts or liner members 61 in the openings 60 against which the rotative thrust reaction of the clutch disks 54 is taken. The housing sections of the casing 11 are in the form of castings, usually metal castings, whereas the inserts 61 are made of steel, usually rolled steel, and are hardened so as to effectively resist any gouging or abrading action by the lugs 59.

The inserts 61 are of a hollow form or U-like shape, in this case, yoke-shaped as shown in FIGS. 3 and 4 of the drawings, and are disposed in the openings 60 so as to extend in an embracing relation to the lugs of the clutch disks 54. When the inserts are located in this relation, the spaced arm portions 61a thereof extend in an axial direction along opposite sides of the lugs 59. When the inserts 61 have been thus assembled into the openings 60, they will be retained in this position by the clutch plates 54 themselves.

If desired, the portions of the casing 17 with which the lugs 59 of the clutch disks co-operate can be suitably hardened to prevent the gouging or abrading action of the lugs. When such portions of the casing are hardened, the inserts 61 are omitted and the lugs directly engage the hardened portions.

FIG. 5 of the drawings shows an alternative construction for the thrust ring 58 in accordance with which this thrust ring is formed as a relatively elevated integral annular land portion of the thrust portion 47 of the casing section 17. Although this integral form of thrust ring or land is here shown as being located on the casing section 17, it could be located on the body of the side gear 33, if desired.

FIGS. 6 and 7 of the drawings show a differential gear mechanism 65 of a form similar to the above described differential mechanism 10, and in which the corresponding parts have been designated by the same reference numerals. An important difference in this modified differential mechanism 65 is that the side gears 32 and 33 are each provided with a friction clutch 13 and with pressure-localizing or pressure-concentrating thrust rings 58 in association with the respective clutches.

Other differences of lesser importance occur in the modified differential mechanism 65 in that the casing 66 is shown as being of a one-piece construction which is open on opposite sides thereof to permit assembly of the gears of the gear train thereinto. The axle shafts 26 and 27 are shown in FIG. 6 as being provided at the inner ends thereof with heads 67 and with horseshoe-like retaining elements 68 engaged with such heads for holding the shafts against outward axial withdrawal. The pinions 34 and 35 are held in a spaced-apart relation on the pinion shaft 36 by a spacer bushing 69.

The functioning of the differential gear mechanism 65 is substantially the same as that described above for the differential mechanism 10, except that the use of a plurality of friction clutches therein in association with the side gears 32 and 33 provides a stronger holding action for retarding rotation of the side gears relative to the casing 66.

FIGS. 8 to 11 inclusive of the drawings show another modified differential gear mechanism 72 of the same type of construction as the differential mechanisms 10 and 65 described above and in which the same reference characters have been applied to the same corresponding parts. In the differential mechanism 72 the pinions of the gear train comprise four pinions 73 supported by the arms 74 of a cross-shaped pinion shaft member 75.

In the differential mechanism 72, the relatively nonrotatable clutch disks 76 of the friction clutches 13 have four anchorage lugs 79 spaced peripherally therearound and which lugs extend into openings 80 of the casing sections 81 and 82. Hardened inserts 83 provided in an embracing relation to the lugs 79 are of a somewhat different shape than the above-described inserts 61 of the differential mechanisms 10 and 65. The inserts 83 are here shown as being generally U-shaped but are constructed so as to have a relatively wide end portion 84 carrying retaining ears 84ª for retaining the inserts in place in the casing sections. The inserts 83 have spaced parallel axially extending arm portions 85 located on opposite sides of the lugs 79 for taking the thrust of the latter.

The inserts 83 can be of a one-piece construction, but preferably, each such insert comprises two complemental sections 83ª and 83ᵇ as shown in FIG. 11.

With respect to the location of the above-described thrust means 58, it is pointed out further that this element is always located so that its engagement with the stack of clutch disks will be at or adjacent the maximum diameter portion of the clutch 13 where a strong frictional engagement between the cooperating disks is desirable and will be of maximum holding effectiveness because it will be acting at the maximum lever-arm distance from the rotation axis 25. The outer diameter of the clutch 13 will depend upon the holding force needed to be developed in the differential mechanism in which it is used and also upon the diameters permissible for the annular thrust portions 47 and 53 of the casing 11 and the side gear 33. The outer diameter of the clutch 13 can be larger or smaller than the maximum diameter of the teeth 40 of the side gear 33 but is preferably the same as the outer diameter of the body 39 of this gear. Thus in the differential mechanism 65 of FIGS. 6 and 7 the body 39 of the side gears 32 and 33 is of substantially the same outer diameter as the gear teeth 40, whereas in the differential mechanism 10 of FIGS. 1 to 3 the body of the side gear 33 is of a greater outside diameter than the gear teeth 40 and in the mechanism 72 of FIGS. 8 to 10 the body of the side gears 32 and 33 is of a smaller outside diameter than the gear teeth 40.

In all of the differential mechanisms 10, 65 and 72, as shown in the drawings and hereinabove described, the casing wall carrying the first annular thrust portion is rigid inasmuch as the wall is relatively thick and the casing is a metal casting. Likewise the gear body having the second annular thrust portion thereon is a rigid body because of its thick and squat shape. It is therefore apparent that, under all normal operating conditions, neither the rigid casing wall nor the rigid gear body will be subject to any substantial flexing thereof by any normal value of clutch actuating force resulting from the pressure-angle torque load reaction between the meshed gear teeth, and consequently, the clutch actuating movement of the second thrust portion will always be in a parallel relation to the first thrust portion.

From the accompanying drawings and the foregoing detailed description it will now be readily understood that this invention provides differential gear mechanism of a simple, compact and practical form in which highly effective clutch means is employed for retarding the rotation of one or more gears of the differential gear train relative to the casing for minimizing traction wheel slippage. It will now also be understood that the novel differential gear mechanism provided by this invention accomplishes this more effective holding action for the differential gearing without any material increase in the complexity or cost of the mechanism.

Although the differential gear mechanism of this invention has been illustrated and described herein to a somewhat detailed extent, it will be understood, of course, that the invention is not to be regarded as being limited correspondingly in scope but includes all changes and modifications coming within the terms of the claims hereof.

Having described my invention, I claim:

1. In a differential gear mechanism, a rotatable casing having a rigid wall carrying an annular thrust portion, a gear train comprising gears rotatable in the casing with the teeth of adjacent gears in meshed engagement, one of said gears comprising a rigid body having an annular thrust portion in a substantially opposed relation to the thrust portion of said casing, said one gear being shiftable to a limited extend relative to said casing for moving the thrust portion of said one gear toward the thrust portion of said casing in a parallel relation to the latter thrust portion in response to a clutch actuating force produced by pressure-angle torque load reaction between the meshed teeth, pressure-responsive friction clutch means including annular friction surfaces and being disposed between said thrust portions for retarding rotation of said one gear relative to the casing, said rigid wall and rigid body being resistant to any substantial flexing thereof by any normal working value of said clutch actuating force for maintaining said parallel relation between said thrust portions, and annular means associated with one of said thrust portions and limiting the engagement of said one thrust portion with said clutch means to an annular surface portion of smaller area than the total surface area of said one thrust portion, said smaller-area annular surface portion being located at or immediately adjacent the maximum diameter portion of the clutch means so that said annular friction surfaces comprise outer annular concentrated-pressure areas and inner annular normally pressure-relieved areas for the development of a maximum clutching action by said friction surfaces at a maximum effective lever-arm distance from the rotation axis of said one gear, said annular friction surfaces being of a greater radial width than said annular means so as to extend radially inward therebeyond, said inner annular areas being rendered also frictionally effective for the clutching and retarding action on said one gear in response to the application of said clutch actuating force when the latter is of a value sufficient to overcome the normally pressure-relieved condition of said inner annular areas.

2. Differential gear mechanism as defined in claim 1 wherein said annular means comprises shim means lying against said one thrust portion.

3. Differential gear mechanism as defined in claim 1 wherein said annular means comprises a land integral with said one thrust portion.

4. Differential gear mechanism as defined in claim 1 wherein said gear train is a train of bevel-type spur gears comprising side gears operably connected by interposed pinion gears, and wherein said one gear is one of said side gears.

5. Differential gear mechanism as defined in claim 1 wherein said clutch means comprises groups of interleaved clutch disks, the disks of one of said groups being connected with said one gear and the disks of the other group being connected with said casing.

6. Differential gear mechanism as defined in claim 1 wherein said clutch means comprises groups of interleaved clutch disks, the disks of one of said groups being connected with said casing and including a disk lying adjacent said one thrust portion and nonrotatable relative to the casing, said annular means being disposed between said one thrust portion and said nonrotatable disk.

7. In a differential gear mechanism, a rotatable casing having a rigid wall carrying an annular thrust portion, a gear train comprising gears rotatable in the casing with the teeth of adjacent gears in meshed engagement, one of said gears comprising a rigid body having an annular thrust portion in a substantially opposed relation to the thrust portion of said casing, said one gear being shiftable to a limited extent relative to said casing for moving the thrust portion of said one gear toward the thrust portion of said casing in a parallel relation to the latter thrust portion in response to a clutch actuating force produced by pressure-angle torque load reaction between the meshed teeth, pressure-responsive friction clutch means including annular friction surfaces and being disposed between said thrust portions for retarding rotation of said one gear relative to the casing, said rigid wall and rigid body being resistant to any substantially flexing thereof by any normal working value of said clutch actuating force for maintaining said parallel relation between said thrust portions, and annular means associated with one of said thrust portions and limiting the engagement of said one thrust portion with said clutch means to an annular surface portion of smaller area than the total surface area of said one thrust portion and lying substantially opposite the maximum diameter portion of the body of said one gear, the surface portion of said one thrust portion lying radially inward of said annular surface portion being in a spaced relation to said clutch means so that said annular friction surfaces comprise outer annular concentrated-pressure areas and inner annular normally pressure-relieved areas for the development of a maximum clutching action by said friction surfaces at a maximum effective lever-arm distance from the rotation axis of said one gear, said annular friction surfaces being of a greater radial width than said annular means so as to extend radially inward therebeyond, said inner annular areas being rendered also frictionally effective for the clutching and retarding action on said one gear in response to the application of said clutch actuating force when the latter is of a value sufficient to overcome the normally pressure-relieved condition of said inner annular areas.

8. In a differential gear mechanism, a rotatable casing having a chamber therein and also having hollow bearing portions in a substantially axially aligned relation on a common rotation axis which is also the rotation axis of the casing, a gear train in said chamber comprising bevel-type sid gears and bevel-type pinion gears disposed between and in meshed-tooth engagement with said side gears, said side gears being supported in said casing by having portions thereof rotatable in said bearing portions, said casing having a rigid wall carrying an annular thrust portion surrounding one of said bearing portions and presented toward the adjacent one of said side gears, said one side gear comprising a rigid body having an annular thrust portion in a substantially opposed relation to the thrust portion of said casing, said one side gear being shiftable to a limited extent relative to said casing for moving the thrust portion of said one side gear toward the thrust portion of said casing in a parallel relation to the latter thrust portion in response to a clutch actuating force produced by pressure angle torque load reaction between the meshed teeth of said gears, pressure-responsive disk-type friction clutch means including annular friction surfaces and being disposed between said thrust portions and effective to retard rotation of said one side gear relative to said casing, said rigid wall and rigid body being resistant to any substantial flexing thereof by any normal working value of said clutch actuating force for maintaining said parallel relation between said thrust portions, and annular means associated with the thrust portion of said casing and engaged by said clutch means, said annular means being of a substantially narrower radial width than the thrust portion of the casing and providing a thrust surface engagement with the clutch means which is of relatively reduced area as compared with the total surface area of said thrust portion of the casing and located substantially opposite the maximum diameter portion of the body of said one side gear so that said annular friction surfaces comprise outer annular concentrated-pressure areas and inner annular normally pressure-relieved areas for the development of a maximum clutching action by said friction surfaces at a maximum effective lever-arm distance from the rotation axis of said one side gear, said inner annular areas extending radially inward beyond said annular means and being rendered also frictionally effective for the clutching and retarding action on said one side gear in response to the application of said clutch actuating force when the latter is of a value sufficient to overcome the normally pressure-relieved condition of said inner annular areas.

9. In a differential gear mechanism, a rotatable casing containing a chamber and also having hollow bearing portions in a substantially axially aligned relation on a common rotation axis which is also the rotation axis of the casing, a gear train in said chamber comprising bevel-type side gears and bevel-type pinion gears disposed between and in meshed-tooth engagement with said side gears, said side gears each comprising a body having an axial stem portion and said side gears being supported in said casing by having their stem portions rotatably received in said hollow bearing portions, said casing having a counterbore therein surrounding one of said hollow bearing portions and defined in part by an axial peripheral annular wall and in part by an annular end wall lying in a transverse plane extending in a substantially perpendicular relation to said rotation axis, one of said side gears having an annular thrust portion facing toward said counterbore and said one side gear being shiftable to a limited extent relative to said casing and toward said counterbore in response to the pressure-angle torque load reaction between the meshed teeth of said one side gear and said pinion gears, pressure-responsive disk-type friction clutch means including annular friction surfaces and being disposed between said thrust portion and the end wall of said counterbore and effective to retard rotation of said one side gear relative to said casing, and annular shim means in said counterbore and engaged by said clutch means and providing an annular thrust portion of reduced area as compared with the total area of said end wall and lying substantially opposite the maximum diameter portion of the body of said one side gear so that said annular friction surfaces comprise outer annular concentrated-pressure areas and inner annular normally pressure-relieved areas for the development of a maximum clutching action by said friction surfaces at a maximum effective lever arm distance from the rotation axis of said one side gear, said inner annular areas extending radially inward beyond said annular shim means and being rendered frictionally effective for the clutching and retarding action on said one side gear in response to the application of a clutch actuating pressure of a value sufficient to overcome the normally pressure-relieved condition of said inner annular areas.

10. A differential gear mechanism as defined in claim 9 wherein said shim means is located in said counterbore and confined by the walls thereof.

11. A differential gear mechanism as defined in claim 9 wherein said shim means is a flat ring of narrower radial width than said annular end wall of the counterbore, said ring having a side face thereof lying against said annular end wall and its outer peripheral edge in engagement with said peripheral wall of the counterbore.

12. In a differential gear mechanism for vehicle axle use, a rotatable casing having opposed side walls provided with hollow bearing portions located on a common axis which is also the rotation axis of the casing and with counterbores surrounding said bearing portions, side gears mounted in said casing each comprising a body carrying an annular series of bevel teeth and a hub means rotatably supported in one of said hollow bearing portions, said counterbores having annular outer end walls and the bodies of said side gears having annular thrust portions in axially opposed relation to said end walls, bevel-type pinion gears rotatably mounted in said casing and disposed between and in meshed-tooth engagement with said side gears, said side gears having limited outward axial movement in response to torque loading thereof, friction clutches actuatable by the outward axial movement of said side gears and comprising clutch disks having annular friction surfaces and being connected with said casing and interleaved clutch disks having annular friction surfaces and being connected with the hub means of said side gears, and flat annular thrust rings located in said counterbores and engaged by maximum diameter portions of the adjacent disks of said clutches, said rings being of narrower radial width than said end walls and said friction surfaces extending radially inward beyond said rings so that said friction surfaces comprise outer annular concentrated-pressure areas and inner annular normally pressure-relieved areas for the development of a maximum clutching action by said friction surfaces at a maximum effective lever arm distance from the rotation axis of said side gears, said inner annular areas being rendered frictionally effective for the clutching and retarding action on said side gears in response to the application of clutch actuating pressure of a value sufficient to overcome the normally pressure-relieved condition of said inner annular areas.

13. In differential gear mechanism, a rotatable metal casing, a gear train in said casing comprising side gears and pinion gears in a meshed-tooth engagement and rotatably supported in said casing, said side gears having a common rotation axis which is also the rotation axis of said casing, one of said side gears comprising a body provided with an axial hub portion and having limited axial shifting in said casing in response to torque loading of said gear train, said casing having an annular thrust portion surrounding said rotation axis and openings located radially outward of said thrust portion and spaced around said rotation axis, friction clutch means located between said one side gear and said thrust portion and actuatable by said limited axial shifting of said one side gear, said clutch means comprising disk means having annular friction surfaces and being connected with said hub portion and other disk means having annular friction surfaces and including an end disk adjacent said thrust portion and nonrotatable relative to the casing, said other disk means having lugs extending into said openings, a flat annular thrust ring lying between said end disk and said thrust portion and being of narrower radial width than the latter, said thrust ring being effective to concentrate the clutch actuating thrust to an annular area located opposite the maximum diameter portion of the body of said one side gear so that said annular friction surfaces each comprise an outer annular concentrated-pressure area and an inner annular normally pressure-relieved area for the development of a maximum clutching action by said friction surfaces at a maximum effective lever-arm distance from the rotation axis of said one side gear, the inner annular areas of said friction surfaces extending radially inward beyond said thrust ring and being also rendered frictionally effective for the clutching and retarding action on said one side gear in response to the application of said clutch actuating force when the latter is of a value sufficient to overcome the normally pressure-relieved condition of said inner annular areas, and yoke-shaped insert means of relatively harder metal than said casing disposed in said openings in an embracing relation to and engaged by said lugs for taking the torque thrust of the latter.

References Cited in the file of this patent

UNITED STATES PATENTS

| | | |
|---|---|---|
| 1,017,762 | Jones | Feb. 20, 1912 |
| 1,481,889 | Carhart | June 29, 1924 |
| 1,683,806 | Richards | Sept. 11, 1928 |
| 2,762,240 | Eckert | Sept. 11, 1956 |
| 2,821,096 | Lyeth | Jan. 28, 1958 |

FOREIGN PATENTS

| | | |
|---|---|---|
| 873,989 | France | July 24, 1942 |